(12) United States Patent
Sohn et al.

(10) Patent No.: US 12,112,500 B2
(45) Date of Patent: Oct. 8, 2024

(54) APPARATUS FOR PERFORMING CYLINDRICAL CONVOLUTIONAL NEURAL NETWORK OPERATION AND APPARATUS AND METHOD FOR OBJECT RECOGNITION AND VIEWPOINT ESTIMATION USING THE SAME

(71) Applicant: INDUSTRY-ACADEMIC COOPERATION FOUNDATION, YONSEI UNIVERSITY, Seoul (KR)

(72) Inventors: Kwang Hoon Sohn, Seoul (KR); Sung Hun Joung, Seoul (KR)

(73) Assignee: INDUSTRY-ACADEMIC COOPERATION FOUNDATION, YONSEI UNIVERSITY, Seoul (KR)

( * ) Notice: Subject to any disclaimer, the term of this patent is extended or adjusted under 35 U.S.C. 154(b) by 477 days.

(21) Appl. No.: 17/468,948

(22) Filed: Sep. 8, 2021

(65) Prior Publication Data

US 2022/0051433 A1 Feb. 17, 2022

Related U.S. Application Data

(63) Continuation of application No. PCT/KR2020/095103, filed on Aug. 14, 2020.

(30) Foreign Application Priority Data

Aug. 13, 2020 (KR) ........................ 10-2020-0101612

(51) Int. Cl.
   *G06T 7/73* (2017.01)
   *G06F 18/28* (2023.01)
   *G06V 10/40* (2022.01)

(52) U.S. Cl.
   CPC ................ *G06T 7/73* (2017.01); *G06F 18/28* (2023.01); *G06V 10/40* (2022.01); *G06T 2207/20084* (2013.01)

(58) Field of Classification Search
   None
   See application file for complete search history.

(56) References Cited

U.S. PATENT DOCUMENTS 3,173,426 A * 3/1965 Touey ................ A24D 3/0204
                                                  131/332
4,036,920 A * 7/1977 Chihiro ................... G21C 3/62
                                                  252/639

(Continued)

FOREIGN PATENT DOCUMENTS

JP            4742190 B2    8/2011
KR       10-1413393 B1    6/2014

(Continued)

OTHER PUBLICATIONS

Sunghun Joung et al., Cylindrical Convolutional Networks for Joint Object Detection and Viewpoint Estimation, CVPR(Computer Vision and Pattern Recognition) 2020, Mar. 2020, pp. 1-10.

(Continued)

*Primary Examiner* — Tsung-Yin Tsai (57) ABSTRACT

The present disclosure provides an apparatus for cylindrical convolutional neural network operation, and an apparatus and method for object recognition and viewpoint estimation using the same. The present disclosure uses a cylindrical convolutional network to recognize objects in the image and to determine the viewpoint, which cylindrical convolutional network performs a convolution operation while sliding the input image in the direction of rotation of the cylindrical kernel and extracts a plurality of view-specific feature vectors according to angular unit intervals, to identify and recognize objects, as well as to determine the viewpoint from which the objects were photographed.

18 Claims, 3 Drawing Sheets

(56) References Cited

U.S. PATENT DOCUMENTS

| | | | |
|---|---|---|---|
| 2007/0090180 A1* | 4/2007 | Griffis | G06Q 10/06 |
| | | | 235/375 |
| 2015/0063628 A1* | 3/2015 | Bernal | G06V 20/52 |
| | | | 382/103 |
| 2015/0324995 A1* | 11/2015 | Yamamoto | G06F 18/22 |
| | | | 382/173 |
| 2018/0182083 A1* | 6/2018 | Natroshvili | G06V 10/454 |
| 2020/0051238 A1 | 2/2020 | El Harouni et al. | |
| 2021/0012106 A1* | 1/2021 | Markhasin | G06F 18/21 |
| 2021/0012567 A1* | 1/2021 | Zhang | G06N 3/08 |
| 2021/0192182 A1* | 6/2021 | Huang | G06F 18/2413 |
| 2022/0051433 A1* | 2/2022 | Sohn | G06V 10/454 |
| 2022/0138978 A1* | 5/2022 | Yan | G06N 3/08 |
| | | | 382/154 |
| 2022/0229140 A1* | 7/2022 | Wang | A61B 5/7221 |
| 2023/0177637 A1* | 6/2023 | Guo | G06N 3/0455 |
| | | | 345/427 |

FOREIGN PATENT DOCUMENTS

| | | |
|---|---|---|
| KR | 10-2020-0008637 A | 1/2020 |
| KR | 10-2020-0062258 A | 6/2020 |
| KR | 10-2020-0092509 A | 8/2020 |
| KR | 10-2020-0092510 A | 8/2020 |

OTHER PUBLICATIONS

International Search Report & Written Opinion issued from PCT International Application No. PCT/KR2020/095103 issued on Apr. 29, 2021.

* cited by examiner

APPARATUS FOR PERFORMING CYLINDRICAL CONVOLUTIONAL NEURAL NETWORK OPERATION AND APPARATUS AND METHOD FOR OBJECT RECOGNITION AND VIEWPOINT ESTIMATION USING THE SAME

CROSS-REFERENCE TO RELATED APPLICATIONS

This application is a continuation of pending PCT International Application No. PCT/KR2020/095103, which was filed on Aug. 14, 2020, and which claims priority from Korean Patent Application No. 10-2020-0101612 filed on Aug. 13, 2020. The disclosure of the above patent application is incorporated herein by reference in their entirety.

BACKGROUND

1. Technical Field

The present disclosure relates to an apparatus for performing an artificial network operation, more particularly to an apparatus for performing cylindrical convolutional neural network operation, and an apparatus and method for object recognition and viewpoint estimation using the same.

2. Description of the Related Art

Recently, artificial networks have been applied in various fields, and among them, a convolutional neural network (CNN) is well known for its excellent performance in visual recognition fields such as image classification, semantic segmentation, object detection, and instance segmentation.

In order for the convolutional neural network to accurately classify or recognize an object even in the geometrical deformation of the object, learning by a large amount of learning data is required. However, in the convolutional neural network, learning is performed using two-dimensional plane images obtained from a specific direction and distance with respect to an object, and thus classification or recognition performance of an object is limited due to various conditions such as a change in the scale of an object, a change in an observation point, and a change in the shape of each object.

Accordingly, several techniques have been proposed to cope with various geometrical deformations of objects in images. As an example, there is a technique of transforming input data by using a spatial transformation model such as an affine transformation or learning an offset of a sampling position in a convolution operation.

However, since the conventional technique processes geometric deformation in 2D space, there is a limit in accurately classifying or recognizing objects of images obtained from various viewpoints in 3D space. Also, in some cases, a viewpoint for an object needs to be determined. For example, recently autonomous vehicles and the like are equipped with a rear camera and a side camera as well as a front camera to acquire an image in all directions around the vehicle, and to recognize surrounding objects from the acquired image. In this case, in order to accurately determine the correlation between the vehicle and the surrounding objects, it should be possible to check the viewpoint from which the object was photographed. That is, even if different vehicles located at the same distance are recognized around the vehicle, in the case of a vehicle in which the front is photographed, it can be determined that the vehicle is approaching, whereas in the case of a vehicle in which the rear is photographed, it can be determined that the vehicle is moving away, so that the state can be determined more accurately. However, as described above, the conventional convolutional neural networks have limitations in object recognition performance, as well as limitations in that it is difficult to determine a viewpoint from which an object is photographed.

Accordingly, there is an increasing demand for a new network capable of accurately estimating the azimuth at which an image of an object is acquired, together with improvement of object recognition performance.

SUMMARY

An object of the present disclosure is to provide an apparatus for cylindrical convolutional neural network operation, capable of significantly improving object recognition performance.

Another object of the present disclosure is to provide an apparatus for cylindrical convolutional neural network operation, capable of accurately estimating the viewpoint at which an object is photographed in an image, together with improvement of object recognition performance.

An apparatus for cylindrical convolutional neural network operation according to an embodiment of the disclosure, conceived to achieve the objectives above, comprises a cylindrical kernel having a structure in which a plurality of weight columns corresponding to a pre-designated angular unit interval are periodically repeated in units of 360 degrees, and, when an input image of a pre-designated size is applied, performs a convolution operation on the number of weight columns corresponding to the angular range of a pre-designated size among the plurality of weight columns of the cylindrical kernel and the input image, so that it is possible to extract a plurality of view-specific feature vectors according to each angular unit interval.

In the cylindrical kernel, the weights of the plurality of weight columns may be obtained by using a plurality of images taken at viewpoints respectively corresponding to angular unit intervals pre-designated for the object during learning, so that features according to several viewpoints of a pre-designated object are extracted.

The cylindrical kernel may be stored as a weight array of a two-dimensional structure in which a weight column corresponding to a pre-designated angle is disconnected and unfolded among the plurality of weight columns having a structure that is repeated at a cycle of 360 degrees according to a corresponding angle.

The cylindrical kernel may be stored as a plurality of weight arrays in which a pre-designated number of weight columns are combined adjacent to each other based on the weight column corresponding to each angle.

The apparatus for cylindrical convolutional neural network operation performs a convolution operation while moving the input image column by column in at least one direction from a weight column corresponding to a pre-designated reference angle in the cylindrical kernel, and, when the input image is moved to one end of the cylindrical kernel unfolded in a two-dimensional structure, may perform a convolution operation with the other end of the weight array having a structure that is repeated at a cycle of 360 degrees.

In the weight array, a pre-designated number of adjacent weight columns at opposite side ends may be additionally disposed at both ends according to a structure that is repeated at a cycle of 360 degrees.

An apparatus for object recognition and viewpoint estimation according to another embodiment of the disclosure, conceived to achieve the objectives above, comprises: a preprocessor unit for receiving an input image including at least one object and extracting an object region feature map that is a region of each of the at least one object in the input image; a cylindrical kernel unit, including a cylindrical kernel having a structure in which a plurality of weight columns corresponding to a pre-designated angular unit interval are periodically repeated in units of 360 degrees, and performing a convolution operation on the number of weight columns corresponding to the angular range of a pre-designated size among the plurality of weight columns of the cylindrical kernel and the object region feature map, thereby extracting a plurality of view-specific feature vectors according to each angular unit interval; a score map acquisition unit, extracting a reliability score according to object class for each of the plurality of view-specific feature vectors by using an artificial neural network in which a plurality of object classes and a plurality of patterns of viewpoints for each object have been learned, thereby obtaining a plurality of score maps; and an object and viewpoint determining unit, analyzing the plurality of score maps obtained according to viewpoint corresponding to each of the plurality of view-specific feature vectors, thereby determining the class of the object and the viewpoint included in the object region.

A method for object recognition and viewpoint estimation according to another embodiment of the disclosure, conceived to achieve the objectives above, comprises the steps of: receiving an input image including at least one object, and extracting an object region feature map that is a region of each of the at least one object in the input image; including a cylindrical kernel having a structure in which a plurality of weight columns corresponding to a pre-designated angular unit interval are periodically repeated in units of 360 degrees, and performing a convolution operation on the number of weight columns corresponding to the angular range of a pre-designated size among the plurality of weight columns of the cylindrical kernel and the object region feature map, thereby extracting a plurality of view-specific feature vectors according to each angular unit interval; extracting a reliability score according to object class for each of the plurality of view-specific feature vectors by using an artificial neural network in which a plurality of object classes and a plurality of patterns of viewpoints for each object have been learned, thereby obtaining a plurality of score maps; and analyzing the plurality of score maps obtained according to viewpoint corresponding to each of the plurality of view-specific feature vectors, thereby determining the class of the object and the viewpoint included in the object region.

Therefore, the apparatus for cylindrical convolutional neural network operation according to an embodiment of the disclosure, and the apparatus and method for object recognition and viewpoint estimation using the same, can accurately determine an object class and a viewpoint from which the object was photographed, by including a convolution kernel composed of a cylindrical structure according to object images obtained from every direction in a pre-designated angular unit to extract a plurality of view-specific feature vectors, and generating score maps based on the plurality of view-specific feature vectors. In addition, it is robust against scale changes, and can accurately set an object region in an image.

DETAILED DESCRIPTION

In order to fully understand the present disclosure, operational advantages of the present disclosure, and objects achieved by implementing the present disclosure, reference should be made to the accompanying drawings illustrating preferred embodiments of the present disclosure and to the contents described in the accompanying drawings.

Hereinafter, the present disclosure will be described in detail by describing preferred embodiments of the present disclosure with reference to accompanying drawings. However, the invention can be implemented in various different forms and is not limited to the embodiments described herein. For a clearer understanding of the invention, parts that are not of great relevance to the invention have been omitted from the drawings, and like reference numerals in the drawings are used to represent like elements throughout the specification.

Throughout the specification, reference to a part "including" or "comprising" an element does not preclude the existence of one or more other elements and can mean other elements are further included, unless there is specific mention to the contrary. Also, terms such as "unit", "device", "module", "block", etc., refer to units for processing at least one function or operation, where such units can be implemented as hardware, software, or a combination of hardware and software.

Figure 1:
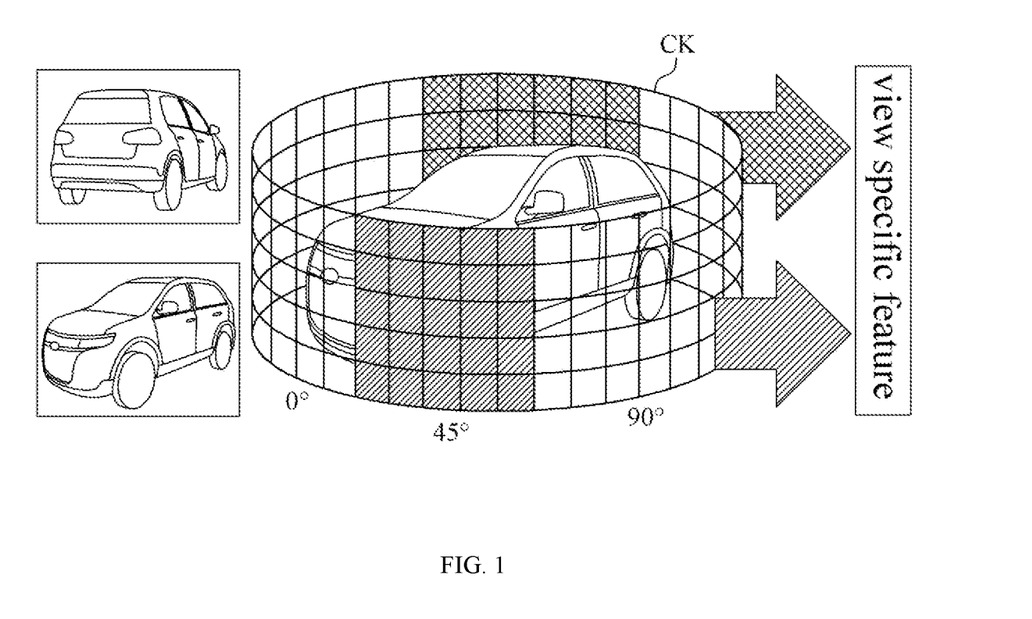
FIG. 1 is a diagram for explaining an apparatus for cylindrical convolutional neural network operation according to an embodiment of the disclosure.

FIG. 1 is a diagram for explaining an apparatus for cylindrical convolutional neural network operation according to an embodiment of the disclosure.

As shown in FIG. 1, an apparatus for cylindrical convolutional neural network operation according to the present embodiment comprises a cylindrical kernel (CK). In the existing convolutional neural network, the kernel is configured in the form of a two-dimensional plane, whereas in the cylindrical convolutional neural network of the present embodiment, the kernel is configured in the form in which a two-dimensional plane is rolled into a cylindrical shape. Accordingly, in the case of the existing convolution kernel, it is configured in a form in which both ends are disconnected as it is configured in a two-dimensional planar form, but in the cylindrical kernel (CK), it may be considered as a planar structure that is rotated repeatedly with a cycle of 360 degrees.

When a specific column in the cylindrical kernel (CK) is set as a reference angle (0°), the reference angle (0°) may also be viewed as an angle (360°) rotated once. That is, in the cylindrical kernel (CK), the concept of both ends does not exist and it has a 360° rotation structure. Here, it is assumed that, based on the reference angle (0°) of the cylindrical kernel (CK), one direction (e.g., clockwise) is assumed to be a positive angular direction, and the other direction (e.g., counterclockwise) is assumed to be a negative angular direction, and it is set to indicate the element of the cylindrical kernel (CK), that is, the position of the kernel weight accordingly. In this case, the angle of the column opposite to the reference angle (0°) in the cylindrical kernel (CK) is 180° or −180°, and 180° and −180° represent the same element column in the cylindrical kernel (CK), that is, the kernel weight column. This indicates that the cylindrical kernel (CK) can be rotated repeatedly with a cycle of 360 degrees.

In addition, when a specific object is located in the cylindrical kernel (CK), the kernel weight, which is each element of the cylindrical kernel (CK), may be acquired by learning in advance so that object features at a corresponding viewpoint can be extracted from positions of each kernel weight in units of columns.

Learning of the cylindrical kernel (CK) may be performed using, as learning data, a plurality of object images acquired in a pre-designated angular unit (here, for example, 15°) with respect to a designated object. That is, the kernel weights of the cylindrical kernel (CK) may be acquired in units of columns by using the object images acquired according to each viewpoint in the omnidirectional viewpoint for a specific object as learning data.

However, even if acquired by photographing the object at a specific viewpoint, the object image is acquired as an object image of a certain angle range. Therefore, even a plurality of object images acquired at a designated angle may be used together to update the weights of the corresponding angle as well as other columns corresponding to the adjacent angular region of a certain range. Accordingly, even if the learning data do not include object images at all viewpoints in the omnidirectional view, the weight columns of the cylindrical kernel (CK) may be learned from the learning data.

In the existing convolutional neural network, it is generally used to extract the feature of an object as an overall feature without distinction of viewpoints for the object. Therefore, it had to be learned to extract the common features of the object images obtained from various viewpoints. Accordingly, in the case of convolutional neural network, object images acquired at various viewpoints were used for learning without distinction of image acquisition viewpoints even when learning the convolution kernel, and due to this, when the convolutional neural network is applied to an object recognition apparatus, or the like, it acts as a major factor that limits the object recognition performance of the object recognition apparatus due to different features for each viewpoint of the object.

For example, as shown in FIG. 1, when performing object recognition for a vehicle, a vehicle image taken at a 45° viewpoint with respect to the front have very different patterns from a vehicle image taken at a −135° viewpoint. Nevertheless, in the existing convolutional neural network, the convolution kernel is learned to extract same features of the vehicle without distinction of photographing viewpoint. Therefore, weights are set to extract common features from vehicle images taken at 45° viewpoint and −135° viewpoint. This become a factor that makes it difficult for the convolutional neural network to accurately extract vehicle features. Moreover, there is a limitation in that it is not possible to determine a viewpoint from which the vehicle included in the applied image is photographed.

In contrast, in the case of the cylindrical kernel (CK) according to the present embodiment, it is learned based on the learning image taken for each pre-designated viewpoint for the object, so that a weight for each location can extract a feature from a corresponding viewpoint of the object. In other words, it is possible to extract view specific features that specifies viewpoint, and in the case of FIG. 1, it is possible to distinguish and extract vehicle features at a 45° viewpoint and a −135° viewpoint. Therefore, when an object recognition apparatus uses an operational apparatus based on a cylindrical convolutional neural network, there are advantages of being able to identify and recognize objects included in the image very accurately, as well as accurately determine the viewpoint from which the image was taken.

Figure 2:
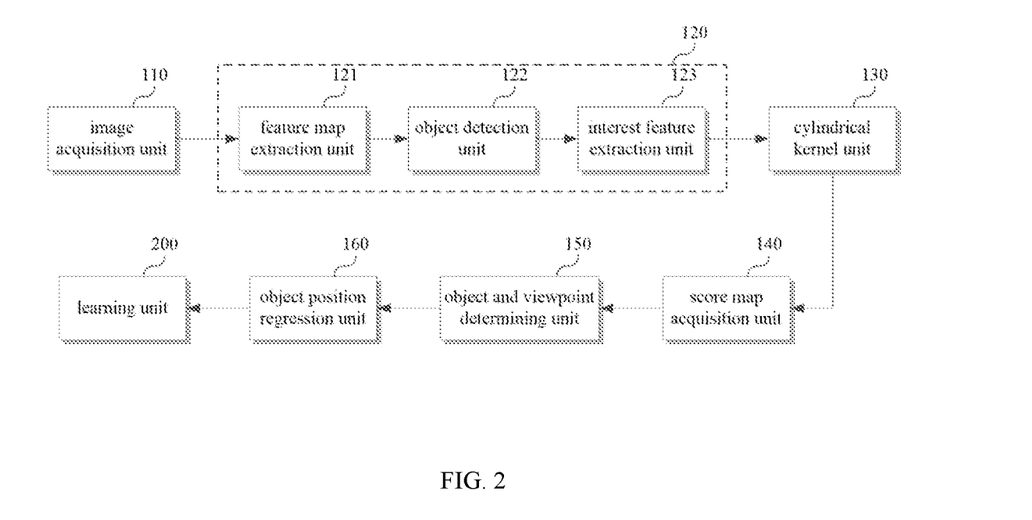
FIG. 2 shows a schematic structure of an apparatus for object recognition and viewpoint estimation to which the cylindrical convolutional neural network of FIG. 1 is applied.
Figure 3:
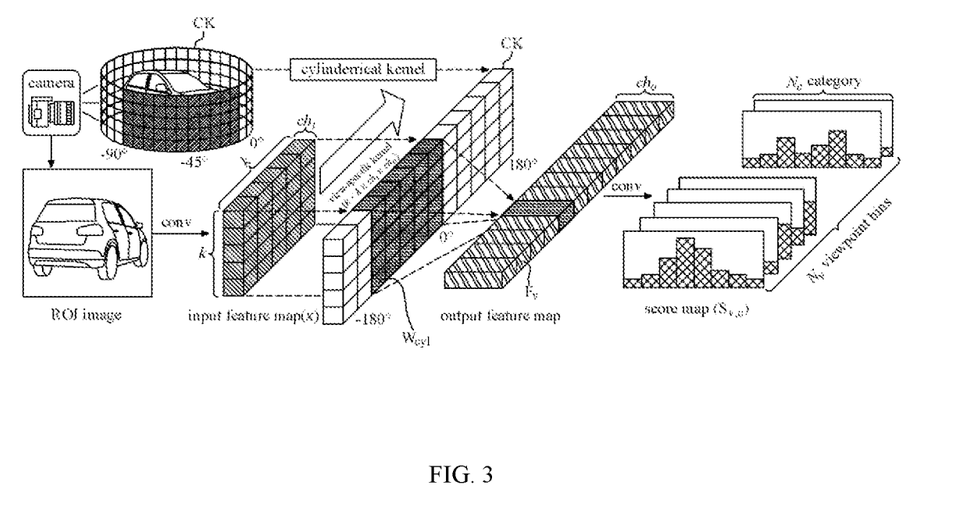
FIG. 3 is a diagram for explaining the concept of estimating an object and a viewpoint based on a cylindrical convolutional network.

FIG. 2 shows a schematic structure of an apparatus for object recognition and viewpoint estimation to which the cylindrical convolutional neural network of FIG. 1 is applied, and FIG. 3 is a diagram for explaining the concept of estimating an object and a viewpoint based on a cylindrical convolutional network.

Referring to FIG. 2, the apparatus for object recognition and viewpoint estimation according to the present embodiment may include an image acquisition unit 110, a preprocessor unit 120, a cylindrical kernel unit 130, a score map acquisition unit 140, an object and viewpoint determining unit 150 and an object position regression unit 160.

The image acquisition unit 110 acquires an image including at least one object. The image acquisition unit 110 is a configuration for acquiring an image including at least one object to be identified, and it may be implemented as an image acquisition means such as a camera that photographs an object, or implemented as a storage means in which previously acquired images are stored, a communication means for receiving an image acquired by an external device, or the like.

The preprocessor unit 120 extracts an object region that is a region of interest (ROI) corresponding to the object from the image acquired by the image acquisition unit 110. The preprocessor unit 120 may extract the object region from the image according to a pre-designated method, but it is assumed here that the preprocessor 120 is implemented as an artificial neural network and extracts a feature map for an object region according to a pre-learned pattern estimation method.

The preprocessor unit 120 may include a feature map extraction unit 121, an object detection unit 122 and an interest feature extraction unit 123. The feature map extraction unit 121 receives the image acquired from the image acquisition unit 110, and extracts the features of the received image according to a pre-learned pattern estimation method to obtain a feature map. The feature map extraction unit 121 may be implemented, for example, as a convolutional neural network (CNN), and may obtain a feature map having the number of channels $ch_i$ in a size of H×W from the received image.

The object detection unit 122 receives the feature map obtained from the feature map extraction unit 121, and detects at least one object candidate from the feature map according to a pre-learned pattern estimation method. The object detection unit 122 may be implemented, for example, as a Region Proposal Network (hereinafter, RPN). The object detection unit 122 implemented as RPN may extract the number (N) of object candidates included in the image and the object position information (t) for each object candidate set in the form of a bounding box from the pattern of the received feature map. Here, the object position information (t) may be composed of a set of coordinate values for the positions of four corners of the bounding box.

The interest feature extraction unit 123 receives the feature map obtained from the feature map extraction unit 121, receives the estimated number (N) of object candidates and object position information (t) from the object detection unit 122, and performs a region of interest pooling (ROI Pooling) in a pre-designated manner such that the region of interest for each object candidate in the feature map has a pre-designated size (here, for example, k×k), thereby extracting the object region feature map (x). Here, the region of interest pooling normalizes the size of the region of interest for each object in the feature map to a pre-designated size, so that the feature of the object can be easily extracted at the cylindrical kernel unit 130 to be described later. The region of interest pooling may be performed in various ways, for example, according to a sampling technique.

Since the configuration of the preprocessor unit 120 for receiving an image and extracting an object region for each of at least one object included in the image, and the operation of each configuration, are also applied in the existing object detection apparatus, the detailed description will be omitted here.

The cylindrical kernel unit 130 is configured as a cylindrical convolutional neural network including a cylindrical kernel (CK), which has been previously learned, and to which a kernel weight has been applied. The cylindrical kernel unit 130 receives an object region feature map (x) that is an image of a region of interest for at least one object extracted by the preprocessor unit 120 from the image, and performs a convolution operation while sliding the received object region feature map (x) column by column from the reference position of the cylindrical kernel (CK), thereby obtaining the output feature map.

In the cylindrical kernel (CK) of the cylindrical kernel unit 130, the height of the cylindrical kernel (CK) may be a pre-designated size, and it may include k rows corresponding to the height (k) of the object region feature map (x) that is input by ROI pooling. In addition, as described above, the cylindrical kernel (CK) is configured by including a plurality of weighted columns for each viewpoint obtained by photographing an object while the viewpoint around the object changes in a pre-designated angular unit. Accordingly, the cylindrical kernel (CK) may be composed of a kernel of a size (k×$N_v$) having the number of rows corresponding to the height (k) and the number of columns corresponding to the number of viewpoint bins ($N_v$).

As described above, assuming that the cylindrical kernel (CK) is learned from a plurality of learning data obtained by photographing an object in a unit of 15° angle, the cylindrical kernel (CK) may be configured to include weight columns corresponding to the number of viewpoint bins ($N_v$) of 24 (360/15=24) during one rotation in the rotation angle direction.

The cylindrical kernel (CK) according to the present embodiment can be viewed as having a cylindrical shape as shown in FIG. 1, however, operation in the actual cylindrical convolutional neural network is performed by various operators in software, and the cylindrical kernel (CK) is also stored in memory. Therefore, the cylindrical kernel (CK) is conceptually configured in a cylindrical shape as shown in FIG. 1, however, in real memory, it may be configured and stored as a weight array in the form of a two-dimensional plane in which a cylinder is unfolded, as shown in FIG. 3. When the cylindrical kernel (CK) is configured in the form of a weight array unfolded in a two-dimensional planar shape, both ends of the unfolded cylindrical kernel (CK) can be considered to be connected to each other. That is, the cylindrical kernel (CK) can be viewed as a weight array configured to be repeated at a cycle of 360°.

Therefore, when performing a convolution operation while moving the object region feature map (x) of a k×k size along the cylindrical kernel (CK), a weight corresponding to a part of the object region feature map (x) of a k×k size does not exist at both ends of the unfolded cylindrical kernel (CK). However, it is possible to perform a convolution operation using the weight of the other end according to the concept of the cylindrical kernel (CK). For example, as shown in FIG. 3, in the case of performing convolution with the unfolded cylindrical kernel (CK) while sliding the object region feature map (x) of a 5×5 size, when the object region feature map (x) slides to one end of the 180° direction of the cylindrical kernel (CK), weights corresponding to 2 columns of one end of the object region feature map (x) of a 5×5 size do not exist at the cylindrical kernel (CK). In this case, the cylindrical kernel unit 130 of the present embodiment is capable of performing a convolution operation, by performing an operation of 2 columns on one end of the object region feature map (x) with weights arranged in 2 columns on the other end in −180° direction of the cylindrical kernel (CK). That is, after 180° one end, it is possible to perform an operation of weights corresponding to 165° and 150° with 2 columns of one side of the object region feature map (x).

Here, the cylindrical kernel (CK) is illustrated as a single kernel, however, the cylindrical kernel (CK) may be composed of a plurality of weight arrays, each having a corresponding angle designated and having the number of columns corresponding to the number of columns in the object region feature map (x). For example, when a plurality of weight columns of the cylindrical kernel (CK) represent 15° angular unit intervals from each other, each of the plurality of weight arrays may be configured as a plurality of weight arrays including 5 weight columns by the angular range, such as weight arrays corresponding to angles in the range of 0° to 75°, weight arrays corresponding to angles in the range of 15° to 90°, and the like, corresponding to the object region feature map (x) consisting of 5 columns. Even in this case, according to the characteristics of the cylindrical kernel (CK), the weight column of each weight array may be configured to have weights repeated at a cycle of 360°. As such, when the cylindrical kernel (CK) is configured with a plurality of weight arrays corresponding to each angle, it is possible to perform a convolution operation of the object region feature map (x) with each of the plurality of weight arrays.

In addition, the cylindrical kernel (CK) may have the number of channels ($ch_i$×$ch_o$) corresponding to the number of channels ($ch_i$) of the object region feature map (x) and the number of channels ($ch_o$) of the output feature map.

Accordingly, the cylindrical kernel (CK) may be configured to have the number of channels (chi×cho) and a size (k×$N_v$) according to the height (k) of the object region feature map (x) and the number of viewpoint bins ($N_v$).

However, in some cases, by additionally arranging the weight of the other end at both ends of the unfolded cylindrical kernel (CK), respectively, the operation for the cylindrical kernel (CK) of the rotated structure can be further simplified. That is, by additionally arranging, at one end of the 180° direction, a pre-designated number of columns arranged in the direction of the other end of the −180° direction, and additionally arranging, at the other end of the −180° direction, a pre-designated number of columns arranged in the direction of one end of the 180° direction, it can simplify an operation in which the object region feature map (x) is slid and rotated with respect to the cylindrical kernel (CK).

As described above, in the cylindrical kernel unit 130, the object region feature map (x) is moved by sliding along the cylindrical kernel (CK), so that a convolution operation is performed. Accordingly, the cylindrical kernel (CK) of the cylindrical kernel unit 130 can be viewed as a combination of the view-specific convolution kernels (WO according to a specific viewpoint, and, as shown in FIG. 3, the operation performed at the cylindrical kernel unit 130 can be viewed as a convolution operation between the object region feature map (x) and the weight ($W_{cyl}$) at a specific viewpoint position (v) among the number of a plurality of viewpoint bins ($N_v$). Accordingly, view-specific feature vectors ($F_v$), obtained according to the convolution operation between the object region feature map (x) and the cylindrical kernel (CK), can be expressed as Math Formula 1.

$$F_v = \sum_{p \in R} W_v(p) \cdot x(p) = \sum_{p \in R} W_{cyl.}(p + o_v) \cdot x(p) \quad \text{[Math Formula 1]}$$

wherein R represents a window of k×k size corresponding to the size of the object region feature map (x), p represents the position within the window R, and $o_v$ represents the offset of the cylindrical kernel weight ($W_{clk}$) for each viewpoint (v).

The cylindrical kernel unit 130 extracts view-specific feature vectors ($F_v$) while moving a number of times corresponding to the number of viewpoint bins ($N_v$), thereby obtaining an output feature map composed of a plurality of view-specific feature vectors ($F_v$). Since it was assumed in the above that the number of viewpoint bins ($N_v$) is 24, the output feature map may be configured to include 24 view-specific feature vectors ($F_v$). In addition, each of the plurality of view-specific feature vectors ($F_v$) may be obtained as a vector of an output channel length ($ch_o$).

The score map acquisition unit 140 receives the output feature map from the cylindrical kernel unit 130, and estimates a level corresponding to each of a plurality of object classes (c) and viewpoints (v) in which a plurality of viewpoint-specific feature vectors ($F_v$) of the output feature map are pre-designated, thereby creating a plurality of score maps ($S_{v,c}$). The score map acquisition unit 140 is implemented as an artificial neural network in which weights for each object class (c) are learned in advance, and performs a pre-designated operation for a plurality of viewpoint-specific feature vectors ($F_v$) of the output feature map, thereby obtaining a score map ($S_{v,c}$) representing a level at which each of the plurality of viewpoint-specific feature vectors ($F_v$) corresponds to a object class (c) of a specific viewpoint (v), that is, a probability. The score map acquisition unit 140 may be implemented, for example, with a plurality of convolution kernels that perform a convolution operation on a plurality of view-specific feature vectors ($F_v$), however in some cases, it may be also implemented with a plurality of fully connected layers.

Referring to FIG. 3, a plurality of score maps ($S_{v,c}$) may be obtained as many as the number of viewpoint bins ($N_v$) according to the number of view-specific feature vectors ($F_v$) corresponding to the number of viewpoint bins ($N_v$), and the object class probability values may be included in each of the plurality of score maps ($S_{v,c}$), in which the number of the object class probability values corresponds to the pre-designated number ($N_c$) of the object classes (c). In FIG. 3, as an example, it was assumed that the number ($N_c$) of object classes (c) is 8, and 8 object class probability values are expressed in bar graph form in each of the plurality of score maps ($S_{v,c}$), but the number ($N_c$) of the object classes (c) may be variously adjusted.

That is, each of the plurality of score maps ($S_{v,c}$) represents a probability corresponding to each of a plurality of object classes (c) for which view-specific feature vectors ($F_v$) are pre-designated at a specific viewpoint (v).

The object and viewpoint determining unit 150 determines the class (c) of the object included in the image and the viewpoint (v) at which the object was photographed, from a plurality of score maps ($S_{v,c}$) acquired for each viewpoint (v) in the score map acquisition unit 140.

As described above, since each of the plurality of score maps ($S_{v,c}$) represents a probability corresponding to a plurality of object classes (c) for which view-specific feature vectors ($F_v$) are pre-designated at a specific viewpoint (v), the object and viewpoint determining unit 150 can recognize the object with an object class (c) corresponding to an object included in the image and determine the viewpoint (v) from the score map ($S_{v,c}$), by searching the object class (c) and the score map ($S_{v,c}$) having the maximum probability value in a plurality of score maps ($S_{v,c}$).

The object and viewpoint determining unit 150 first performs a soft max operation (σ) on a plurality of score maps ($S_{v,c}$) and normalizes the score map ($S_{v,c}$), thereby obtaining a viewpoint probability distribution ($P_{v,c} = \sigma(S_{v,c})$).

Then, according to Math Formula 2, it calculates and obtains the final class score ($S_c$) from the plurality of score maps ($S_{v,c}$) acquired for each viewpoint.

$$S_c = \sum_{v=1}^{N_v} S_{v,c} \cdot P_{v,c} \quad \text{[Math Formula 2]}$$

However, the plurality of score maps ($S_{v,c}$) are obtained as probability values at discrete viewpoints according to the number of viewpoint bins ($N_v$). Since the plurality of score maps ($S_{v,c}$) are composed of probability values at discrete viewpoints, the object and viewpoint determining unit 150 cannot accurately predict the viewpoint of the object photographed at a viewpoint between a plurality of pre-designated viewpoints (v). That is, it can be determined only with the designated $N_v$ viewpoints. Accordingly, in order to estimate the exact viewpoint of the object included in the image, the object and viewpoint determining unit 150 estimates the exact viewpoint of the object by applying a sinusoidal soft-argmax function.

The object and viewpoint determining unit 150 estimates a viewpoint by applying a sinusoidal function to each viewpoint angle ($i_v$) as shown in FIG. 3. Since it was assumed here that the cylindrical kernel (CK) includes $N_v$ viewpoints by 15°, each viewpoint angle ($i_v$) is ({−180°, −165°, ..., 0°, 15°, ..., 180° }, where −180° and 180° are the same). By using the viewpoint probability distribution ($P_{v,c} = \sigma(S_{v,c})$) of Math Formula 2 and the sinusoidal function, it can estimate the exact viewpoint ($\theta_c$) of the object in the continuous viewpoint interval according to Math Formula 3.

$$\theta_c = \text{atan2}\left(\sum_{v=1}^{N_v} P_{v,c} \sin(i_v), \sum_{v=1}^{N_v} P_{v,c} \cos(i_v)\right) \quad \text{[Math Formula 3]}$$

Here, the object and viewpoint determining unit 150 estimates by converting the discrete viewpoints of the plurality of score maps ($S_{v,c}$) into continuous viewpoint intervals using the sinusoidal function, and this is not only to estimate the exact viewpoint of an object, but also to convert it into a differentiable structure to enable learning of the apparatus for object recognition and viewpoint estimation.

The object position regression unit 160 regresses the bounding box in order to estimate a more accurate position of the object according to the determined object class (c) and the viewpoint ($\theta_c$). The object position regression unit 160 may also be implemented as an artificial neural network, and may be implemented, for example, as a convolutional neural network. The object position regression unit 160 regresses the bounding box to accurately designate the object region, by generating a bounding box offset ($t_{v,c}$) of a size corresponding to the object class (c) and the viewpoint ($\theta_c$) from a plurality of viewpoint-specific feature vectors ($F_v$) according to the pre-learned pattern estimation method and by encoding the object position information (t) estimated by the object detection unit 122 of the preprocessor unit 120.

A learning unit 200 is provided when learning of the object recognition and viewpoint estimation apparatus, and makes the object recognition and viewpoint estimation apparatus learn. When learning of the object recognition and viewpoint estimation apparatus, an image, in which an object class (c), bounding box information (t) and a viewpoint ($\theta$) are designated in advance, is used as learning data.

The learning unit 200 transmits the image of the learning data to the image acquisition unit 110, receives the object class (C) and the viewpoint ($\theta$) determined at the object and viewpoint determining unit 150 and the bounding box information (obtained from the object position regression unit 160, calculates the loss (L) according to Math Formula 4, and makes the object recognition and viewpoint estimation apparatus learn by backpropagating the calculated loss (L).

$$L = L_{cls}(c, \hat{c}) + [\hat{c} \geq 1]\{L_{reg}(t_{v,c}, \hat{t}) + [\hat{\theta} \neq 0]L_{view}(\theta_c, \hat{\theta})\}$$ [Math Formula 4]

In Math Formula 4, the square bracket [ ] is an Iverson function that outputs 1 if true and 0 if false, and, when the object class ($\hat{c}$) is 0, the bounding box loss ($L_{reg}$) and the viewpoint loss ($L_{view}$) are ignored. When using learning data including a viewpoint ($\theta \neq 0$), the viewpoint loss ($L_{view}$) may be applied, however, when using learning data not including a viewpoint, the viewpoint loss ($L_{view}$) may be omitted. In addition, the class loss ($L_{cls}$) may be calculated according to the cross entropy technique, and the bounding box loss ($L_{reg}$) and the viewpoint loss ($L_{view}$) may be calculated with the L1 nome function.

Additionally, when learning a left-right symmetric object class to a cylindrical kernel (CK), it is possible to set an additional constraint on the weight ($W_{cyl}$) of the cylindrical kernel (CK). When learning a left-right symmetric object class, the weight ($W_{cyl}$) of the cylindrical kernel (CK) may be divided into a front weight ($w_{front}$) at the reference angle (0°) corresponding to the front, a rear weight ($w_{rear}$) at the angle (180°) corresponding to the rear, and a left side weight ($W_{left}$) and a right side weight ($W_{right}$) corresponding to the left angle range and right angle range.

If the object is left-right symmetric, since the left side weight ($W_{left}$) and the right side weight ($W_{right}$) must have weights horizontally flipped each other, the right side weight ($W_{right}$) can be obtained as $W_{right} = h(W_{left})$ by applying the flip function (h) to the left side weight ($W_{left}$). That is, when the learning target object is left-right symmetric, the learning unit 200 may acquire only one of the left side weights ($W_{left}$) and the right side weights ($W_{right}$) by learning, and acquire the rest by using the flip function. This not only greatly reduces the memory capacity of the learning unit 200, but also reduces the amount of operation, so that the object recognition and viewpoint estimation apparatus can be efficiently learned.

Figure 4:
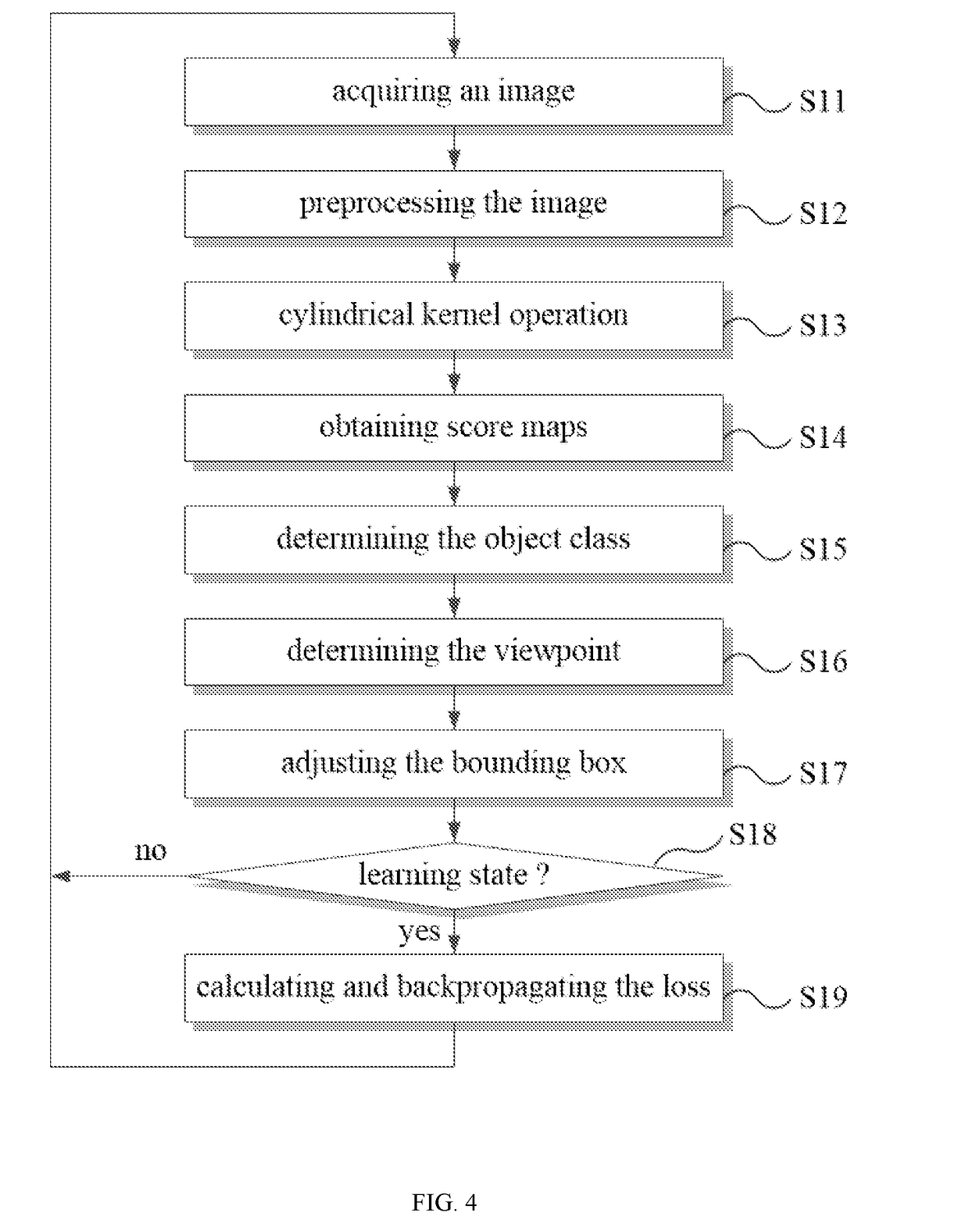
FIG. 4 shows an object recognition and viewpoint estimation method according to an embodiment of the present disclosure.

FIG. 4 shows an object recognition and viewpoint estimation method according to an embodiment of the present disclosure.

The object recognition and viewpoint estimation method of FIG. 4 is explained with reference to FIG. 1 to FIG. 3. First, an image including at least one object to be recognized is acquired (S11). Then, pre-designated preprocessings are performed on the acquired image (S12). In the preprocessing step, first, a feature map is generated by extracting features from a pattern of the acquired image using a convolutional neural network. Then, the number of object candidates (N) and the object position information (t) for each object candidate set in the form of a bounding box are extracted from the feature map using a region proposal network (RPN) or the like. In addition, the object region feature map (x) is extracted by ROI pooling and normalizing each of the object position information (t) for each object candidate using an artificial neural network.

When the object region feature map (x) is extracted for each object included in the image by preprocessing the image, an output feature map composed of a plurality of view-specific feature vectors ($F_v$) obtained according to Math Formula 1 is obtained (S13), by performing a convolution operation while sliding the object region feature map (x) on a cylindrical kernel in which weights for objects are set by the column for each viewpoint angle and repeated by 360 degrees. Then, a plurality of score maps ($S_{v,c}$) are obtained (S14), which represents a probability that each of the plurality of view-specific feature vectors ($F_v$) corresponds to a plurality of object classes (c) of each viewpoint (v), by using an artificial neural network.

When the plurality of score maps ($S_{v,c}$) are obtained, an object class is determined according to the sum of scores for the corresponding object classes (c) in the plurality of score maps ($S_{v,c}$) (S15). At this time, the object classes (c) can be determined, by obtaining a viewpoint probability distribution ($P_{v,c}$) by means of performing a soft max operation ($\sigma$) on the plurality of score maps ($S_{v,c}$) and normalizing the score map ($S_{v,c}$), calculating the obtained viewpoint probability distribution ($P_{v,c}$), and calculating the final class score ($S_c$) according to Math Formula 2 using the calculated viewpoint probability distribution ($P_{v,c}$) and the score maps ($S_{v,c}$).

Thereafter, the viewpoint ($\theta_c$) at which the object included in the image is photographed is determined according to the plurality of score maps ($S_{v,c}$) and the determined object classes (c) (S16). At this time, the object viewpoint ($\theta_c$) may be calculated according to Math Formula 3 by applying the sinusoidal function to the viewpoint angle ($i_v$) designated during learning together with the viewpoint probability distribution ($P_{v,c}$). Then, the object bounding box of the object position information (t) is adjusted to correspond to the determined classes (c) and the object viewpoint ($\theta_c$) using the artificial neural network (S17).

In this case, if there are a plurality of objects included in the image, it can be repeatedly performed from the cylindrical kernel operation step (S13) until the class (c) and viewpoint ($\theta_c$) and object bounding box are extracted for all objects included in the image.

When the class (c) and viewpoint ($\theta_c$) are determined for a specific object in the image, and the object bounding box is adjusted, it is determined whether the current state is a learning state (S18). If it is determined to be in a learning state, the loss (L) is calculated according to Math Formula 4, by comparing the acquired class (c), viewpoint ($\theta_c$) and bounding box with the class (c), viewpoint ($\theta_c$) and bounding box designated in advance in the image acquired as learning data, and learning is performed by backpropagating the calculated loss (S19). In this case, the learning may be repeated a pre-designated number of times or until the loss (L) becomes less than or equal to a pre-designated reference loss.

The method according to embodiments of the present disclosure may be implemented as a computer program stored in a medium for executing the method in a computer. In this case, the computer-readable medium may be accessible by a computer, and may include all suitable computer storage media. Examples of such computer storage media include all of volatile and nonvolatile media and separation type and non-separation type media implemented by a given method or technology for storing information, such as a computer-readable instruction, a data structure, a program module or other data, and may include a read only memory (ROM), a random access memory (RAM), a compact disk (CD)-ROM, a digital video disk (DVD)-ROM, a magnetic tape, a floppy disk, and an optical data storage device.

The present disclosure has been illustrated and described in connection with various embodiments, but the embodiments are merely exemplary. A person having ordinary skill in the art to which the present disclosure pertains will understand that various modifications and other equivalent embodiments are possible from the embodiments.

Accordingly, the present disclosure encompasses all variations that fall within the scope of the claims.

What is claimed is:

1. An apparatus for cylindrical convolutional neural network operation, the apparatus comprising a cylindrical kernel having a structure in which a plurality of weight columns corresponding to a pre-designated angular unit interval are periodically repeated in units of 360 degrees, and
when an input image of a pre-designated size is applied, the apparatus performing a convolution operation on the number of weight columns corresponding to an angular range of a pre-designated size among the plurality of weight columns of the cylindrical kernel and the input image, to extract a plurality of view-specific feature vectors according to each angular unit interval,
wherein the cylindrical kernel is stored as a weight array of a two-dimensional structure in which a weight column corresponding to a pre-designated angle is disconnected and unfolded among the plurality of weight columns having a structure that is repeated at a cycle of 360 degrees according to a corresponding angle,
wherein the cylindrical kernel is stored as a plurality of weight arrays in which a pre-designated number of weight columns are combined adjacent to each other based on the weight column corresponding to each angle.

2. The apparatus for cylindrical convolutional neural network operation according to claim 1, wherein, in the cylindrical kernel,
weights of the plurality of weight columns are obtained by using a plurality of images taken at viewpoints respectively corresponding to angular unit intervals pre-designated for an object during learning, so that features according to several viewpoints of a pre-designated object are extracted.

3. The apparatus for cylindrical convolutional neural network operation according to claim 1, wherein the apparatus for cylindrical convolutional neural network operation performs a convolution operation while moving the input image column by column in at least one direction from a weight column corresponding to a pre-designated reference angle in the cylindrical kernel, and, when the input image is moved to one end of the cylindrical kernel unfolded in a two-dimensional structure, performs a convolution operation with the other end of the weight array having a structure that is repeated at a cycle of 360 degrees.

4. The apparatus for cylindrical convolutional neural network operation according to claim 1, wherein, in the weight array,
a pre-designated number of adjacent weight columns at opposite side ends are additionally disposed at both ends according to a structure that is repeated at a cycle of 360 degrees.

5. An apparatus for object recognition and viewpoint estimation, comprising:
a preprocessor unit for receiving an input image including at least one object and extracting an object region feature map that is a region of each of the at least one object in the input image;
a cylindrical kernel unit, including a cylindrical kernel having a structure in which a plurality of weight columns corresponding to a pre-designated angular unit interval are periodically repeated in units of 360 degrees, and performing a convolution operation on the number of weight columns corresponding to an angular range of a pre-designated size among the plurality of weight columns of the cylindrical kernel and the object region feature map, thereby extracting a plurality of view-specific feature vectors according to each angular unit interval;
a score map acquisition unit, extracting a reliability score according to object class for each of the plurality of view-specific feature vectors by using an artificial neural network in which a plurality of object classes and a plurality of patterns of viewpoints for each object have been learned, thereby obtaining a plurality of score maps; and
an object and viewpoint determining unit, analyzing the plurality of score maps obtained according to viewpoint corresponding to each of the plurality of view-specific feature vectors, thereby determining the class of the object and the viewpoint included in the object region.

6. The apparatus for object recognition and viewpoint estimation according to claim 5, wherein the cylindrical kernel is stored as a weight array of a two-dimensional structure in which a weight column corresponding to a pre-designated angle is disconnected and unfolded among the plurality of weight columns having a structure that is repeated at a cycle of 360 degrees according to a corresponding angle.

7. The apparatus for object recognition and viewpoint estimation according to claim 5, wherein the preprocessor unit comprises:
a feature map extraction unit, which is implemented as an artificial neural network in which a pattern estimation method is learned in advance, and extracts features of the input image, to obtain a feature map;
an object detection unit, which is implemented as an artificial neural network in which a pattern estimation method is learned in advance, detects objects from the feature map, and extracts, in a form of bounding box, a region including each of the detected objects, to obtain object position information; and an interest feature extraction unit, which receives the object position information for each of the detected objects and normalizes a region for each object in the feature map to a pre-designated size.

8. The apparatus for object recognition and viewpoint estimation according to claim 7, wherein the object and viewpoint determining unit performs a soft max operation on the plurality of score maps and normalizes the plurality of score maps, thereby obtaining a viewpoint probability distribution for each class and viewpoint, and acquires a final class score by weighted accumulation of the viewpoint probability distribution corresponding to each of the plurality of score maps, thereby recognizing the object.

9. The apparatus for object recognition and viewpoint estimation according to claim 8, wherein the object and viewpoint determining unit acquires the final class score (Sc) according to the following Math Formula:

$$S_c = \sum_{v=1}^{N_v} S_{v,c} \cdot P_{v,c}$$

(wherein, Nv is the number of viewpoints in the cylindrical kernel and is the number of weight columns, Sv,c is the score map, and Pv,c is obtained as (Pv,c=σ(Sv,c)) by using the soft max function (σ), as a viewpoint probability distribution for each class and viewpoint), and determines a viewpoint (θc) of the object according to the following Math Formula:

$$\theta_c = \text{atan2}\left(\sum_{v=1}^{N_v} P_{v,c}\sin(i_v), \sum_{v=1}^{N_v} P_{v,c}\cos(i_v)\right)$$

by applying a sinusoidal function to a viewpoint angle (iv) designated in each of the plurality of weight columns of the cylindrical kernel together with the viewpoint probability distribution.

10. The apparatus for object recognition and viewpoint estimation according to claim 7, wherein the apparatus for object recognition and viewpoint estimation further comprises:

an object position regression unit, which regresses the bounding box by adjusting the object position information obtained in the preprocessor unit, in response to the object class and viewpoint determined by using the artificial neural network in which a pattern estimation method is learned in advance.

11. The apparatus for object recognition and viewpoint estimation according to claim 10, wherein the apparatus for object recognition and viewpoint estimation further comprises a learning unit to perform learning, and the learning unit obtains an image, in which an object class (c), bounding box information (t) and a viewpoint (θ) are designated in advance as learning data, applies the image as the input image, and calculates and backpropagates a loss by comparing an object class (ĉ) and a viewpoint (θ̂) and bounding box information (t̂) determined from the applied input image with the object class (c), the bounding box information (t) and the viewpoint (θ) designated in the learning data.

12. A method for object recognition and viewpoint estimation, the method comprising the steps of:

receiving an input image including at least one object, and extracting an object region feature map that is a region of each of the at least one object in the input image;

including a cylindrical kernel having a structure in which a plurality of weight columns corresponding to a pre-designated angular unit interval are periodically repeated in units of 360 degrees, and performing a convolution operation on the number of weight columns corresponding to an angular range of a pre-designated size among the plurality of weight columns of the cylindrical kernel and the object region feature map, thereby extracting a plurality of view-specific feature vectors according to each angular unit interval;

extracting a reliability score according to object class for each of the plurality of view-specific feature vectors by using an artificial neural network in which a plurality of object classes and a plurality of patterns of viewpoints for each object have been learned, thereby obtaining a plurality of score maps; and analyzing the plurality of score maps obtained according to viewpoint corresponding to each of the plurality of feature vectors according to viewpoint, thereby determining the class of the object and the viewpoint included in the object region.

13. The method for object recognition and viewpoint estimation according to claim 12, wherein the cylindrical kernel is stored as a weight array of a two-dimensional structure in which a weight column corresponding to a pre-designated angle is disconnected and unfolded among the plurality of weight columns having a structure that is repeated at a cycle of 360 degrees according to a corresponding angle.

14. The method for object recognition and viewpoint estimation according to claim 12, wherein the step of extracting the object region feature map comprises the steps of:

being implemented as an artificial neural network in which a pattern estimation method is learned in advance, and extracting features of the input image, to obtain a feature map;

being implemented as an artificial neural network in which a pattern estimation method is learned in advance, detecting objects from the feature map, and extracting, in a form of bounding box, a region including each of the detected objects, to obtain object position information; and receiving the object position information for each of the detected objects and normalizing a region for each object in the feature map to a pre-designated size.

15. The method for object recognition and viewpoint estimation according to claim 14, wherein the step of determining the class of the object and the viewpoint comprises the steps of:

performing a soft max operation on the plurality of score maps and normalizes the plurality of score maps, thereby obtaining a viewpoint probability distribution for each class and viewpoint;

acquiring a final class score by weighted accumulation of the viewpoint probability distribution corresponding to each of the plurality of score maps, thereby recognizing the object; and determining a viewpoint of the object by applying a sinusoidal function to a viewpoint angle designated in each of the plurality of weight columns of the cylindrical kernel together with the viewpoint probability distribution.

16. The method for object recognition and viewpoint estimation according to claim 15, wherein the step of recognizing the object acquires the final class score (Sc) according to the following Math Formula:

$$S_c = \sum_{v=1}^{N_v} S_{v,c} \cdot P_{v,c}$$

(wherein, Nv is the number of viewpoints in the cylindrical kernel and is the number of weight columns, Sv,c is the score map, and Pv,c is obtained as (Pv,c=σ(Sv,c)) by using the soft max function (σ), as a viewpoint probability distribution for each class and viewpoint), and the step of determining a viewpoint of the object determines a viewpoint (θc) of the object according to the following Math Formula:

$$\theta_c = \mathrm{atan2}\left(\sum_{v=1}^{N_v} P_{v,c}\sin(i_v), \sum_{v=1}^{N_v} P_{v,c}\cos(i_v)\right)$$

(wherein, iv is a viewpoint angle designated to each of a plurality of weight columns).

17. The method for object recognition and viewpoint estimation according to claim 14, wherein the method for object recognition and viewpoint estimation further comprises the step of:

regressing the bounding box by adjusting the object position information obtained in the step of extracting an object region feature map, in response to the object class and viewpoint determined by using the artificial neural network in which a pattern estimation method is learned in advance.

18. The method for object recognition and viewpoint estimation according to claim 17, wherein the method for object recognition and viewpoint estimation further comprises a step of learning, and the step of learning comprises steps of:

obtaining an image, in which an object class (c), bounding box information (t) and a viewpoint (θ) are designated in advance, as learning data, and applying the image as the input image; and calculating and backpropagating a loss by comparing an object class (ĉ) and a viewpoint (θ̂) and bounding box information (t̂) determined from the applied input image with the object class (c), the bounding box information (t) and the viewpoint (θ) designated in the learning data.

* * * * *